US008619692B2

(12) United States Patent
Lee et al.

(10) Patent No.: US 8,619,692 B2
(45) Date of Patent: Dec. 31, 2013

(54) METHOD FOR TRANSMITTING AND RECEIVING UPLINK REFERENCE SIGNAL IN A WIRELESS COMMUNICATION SYSTEM HAVING MULTIPLE ANTENNAS

(75) Inventors: Daewon Lee, Anyang-si (KR); Young Woo Yun, Anyang-si (KR); Yujin Noh, Anyang-si (KR); Bonghoe Kim, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 218 days.

(21) Appl. No.: 13/128,633

(22) PCT Filed: Dec. 9, 2009

(86) PCT No.: PCT/KR2009/007349
§ 371 (c)(1),
(2), (4) Date: May 10, 2011

(87) PCT Pub. No.: WO2010/068030
PCT Pub. Date: Jun. 17, 2010

(65) Prior Publication Data
US 2011/0228737 A1 Sep. 22, 2011

Related U.S. Application Data

(60) Provisional application No. 61/120,854, filed on Dec. 9, 2008.

(30) Foreign Application Priority Data

Jan. 30, 2009 (KR) .................. 10-2009-0007563

(51) Int. Cl.
*H04W 4/00* (2009.01)

(52) U.S. Cl.
USPC .......................................... 370/329

(58) Field of Classification Search
USPC ............................ 370/329, 336, 344
See application file for complete search history.

(56) References Cited

U.S. PATENT DOCUMENTS

| 8,014,265 | B2 * | 9/2011 | Sarkar et al. ............. 370/203 |
| 8,391,268 | B2 * | 3/2013 | Papasakellariou et al. ... 370/344 |
| 2004/0081123 | A1 * | 4/2004 | Krishnan et al. ........... 370/329 |
| 2005/0286465 | A1 * | 12/2005 | Zhuang ................... 370/329 |
| 2007/0002726 | A1 * | 1/2007 | Zangi ..................... 370/208 |
| 2008/0260062 | A1 | 10/2008 | Imamura |
| 2008/0298433 | A1 * | 12/2008 | Tiirola et al. ............ 375/132 |
| 2009/0097457 | A1 * | 4/2009 | Papasakellariou et al. ... 370/336 |
| 2009/0196204 | A1 * | 8/2009 | Astely et al. .............. 370/280 |
| 2010/0074244 | A1 * | 3/2010 | Luo et al. ................. 370/343 |
| 2010/0214992 | A1 * | 8/2010 | Hart et al. ................ 370/329 |

(Continued)

FOREIGN PATENT DOCUMENTS

KR 1020000047620 7/2000

*Primary Examiner* — Asad Nawaz
*Assistant Examiner* — Syed S Ali
(74) *Attorney, Agent, or Firm* — Lee, Hong, Degerman, Kang & Waimey

(57) ABSTRACT

A method for transmitting and receiving uplink reference signals in a wireless communication system having multiple antennas is disclosed. The uplink reference signal transmission method includes transmitting a first reference signal sequence to a base station, and transmitting a second reference signal sequence to the base station, the second reference signal sequence being obtained by cyclically shifting the first reference signal sequence by a first cyclic delay value.

5 Claims, 4 Drawing Sheets

(56) References Cited

U.S. PATENT DOCUMENTS

| | | | |
|---|---|---|---|
| 2010/0278137 A1* | 11/2010 | Kwon et al. | 370/330 |
| 2011/0134867 A1* | 6/2011 | Lee et al. | 370/329 |
| 2011/0149903 A1* | 6/2011 | Krishnamurthy et al. | 370/330 |
| 2011/0150144 A1* | 6/2011 | Sohn | 375/340 |
| 2011/0228877 A1* | 9/2011 | Han et al. | 375/295 |
| 2011/0310837 A1* | 12/2011 | Classon et al. | 370/329 |
| 2012/0076098 A1* | 3/2012 | Han et al. | 370/329 |
| 2012/0127949 A1* | 5/2012 | Yoshimoto et al. | 370/329 |
| 2012/0163365 A1* | 6/2012 | Papasakellariou et al. | 370/345 |
| 2013/0194931 A1* | 8/2013 | Lee et al. | 370/241 |

\* cited by examiner (a) SHORT CHANNEL DELAY (b) LONG CHANNEL DELAY

METHOD FOR TRANSMITTING AND RECEIVING UPLINK REFERENCE SIGNAL IN A WIRELESS COMMUNICATION SYSTEM HAVING MULTIPLE ANTENNAS

CROSS-REFERENCE TO RELATED APPLICATIONS

This application is the National Stage filing under 35 U.S.C. 371 of International Application No. PCT/KR2009/007349, filed on Dec. 9, 2009, which claims the benefit of earlier filing date and right of priority to Korean Application No. 10-2009-0007563, filed on Jan. 30, 2009, and also claims the benefit of U.S. Provisional Application Ser. No. 61/120,854, filed on Dec. 9, 2008, the contents of all of which are incorporated by reference herein in their entirety.

TECHNICAL FIELD

The present invention relates to a wireless communication system, and more particularly, to a method for transmitting and receiving an uplink reference signal in a wireless communication system.

BACKGROUND ART

In a wireless communication system, a packet is transmitted on a radio channel. In view of the nature of the radio channel, the packet may be distorted during the transmission. To receive the signal successfully, a receiver should compensate for the distortion in the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or a Reference Signal (RS). In case of data transmission and reception through multiple antennas, knowledge of channel states between Transmission (Tx) antennas and Reception (Rx) antennas is required for successful signal reception. Accordingly, different RS sequences should be configured for the respective Tx antennas.

FIG. 1 illustrates an uplink subframe structure in a 3rd Generation Partnership Project Long Term Evolution (3GPP LTE). Referring to FIG. 1, the horizontal axis represents frequency and the vertical axis represents time. Data is transmitted on a subframe basis and one subframe includes two slots each having six or seven symbols. An RS sequence occupies one symbol in each slot. The RS sequence is transmitted across an allocated total frequency band.

In the LTE system, a plurality of User Equipments (UEs) communicate with an evolved Node B (eNode B or eNB) in Spatial Division Multiple Access (SDMA). For the SDMA communication with the eNB, each of the UEs generates an RS sequence based on a control signal received from the eNB and transmits the RS sequence to the eNB.

To allow the eNB to stably decode the RS sequences received from the UEs, the RS sequences should be mutually orthogonal or have small cross correlations with one another. As the LTE system supports only one antenna on an uplink, a UE transmits one RS at one time.

Compared to conventional wireless communication systems that support a single antenna on an uplink, future wireless communication systems are highly likely to support uplink data transmission from a UE through multiple antennas. For instance, a UE should transmit uplink RSs through up to four antennas in a Long Term Evolution??Advanced (LTE??A) system. Accordingly, there exists a need for developing a method for transmitting a plurality of RSs from a UE.

DISCLOSURE OF INVENTION

Technical Problem

An object of the present invention devised to solve the problem lies on a method for efficiently transmitting uplink RSs through multiple antennas in a wireless communication system.

Another object of the present invention devised to solve the problem lies on a method for transmitting uplink RSs such that control information transmitted from an eNB to a UE is reduced.

Another object of the present invention devised to solve the problem lies on a method for transmitting uplink RSs, which enables efficient use of time-frequency resources.

A further object of the present invention devised to solve the problem lies on a method for transmitting uplink RSs such that an eNB may transmit response information in compatibility with an existing system.

It will be appreciated by persons skilled in the art that that the objects that could be achieved with the present invention are not limited to what has been particularly described hereinabove and the above and other objects that the present invention could achieve will be more clearly understood from the following detailed description taken in conjunction with the accompanying drawings.

Solution to Problem

The object of the present invention can be achieved by providing a method for transmitting uplink reference signals through multiple antennas in a user equipment in a wireless communication system, including transmitting a first reference signal sequence to a base station, and transmitting a second reference signal sequence to the base station, the second reference signal sequence being obtained by cyclically shifting the first reference signal sequence by a first cyclic delay value.

In another aspect of the present invention, provided herein is a method for receiving uplink reference signals transmitted through multiple antennas in a wireless communication system, including transmitting a control signal including indication information indicating a first cyclic delay value to a user equipment, and receiving a plurality of reference signal sequences including a first reference signal sequence generated based on the first cyclic delay value and a second reference signal sequence generated by cyclically shifting the first reference signal sequence by a second cyclic delay value.

The first cyclic delay value may be a predetermined value known to the user equipment.

The first cyclic delay value may be determined according to a cyclic prefix length used in the wireless communication system.

The wireless communication system may have a plurality of predetermined cyclic delay values. Then the first cyclic delay value may be calculated by subtracting the second cyclic delay value from a minimum of values larger than a sum of the cyclic prefix length and the second cyclic shift value, among the plurality of predetermined cyclic delay values.

Advantageous Effects of Invention

Exemplary embodiments of the present invention offer the following effects.

Uplink RSs can be transmitted efficiently through multiple antennas in a wireless communication system.

The amount of control information transmitted from an eNB to a UE can be reduced.

Time-frequency resources can be efficiently used.

The eNB can transmit response information in compatibility with an existing system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Now, the above and other aspects of the present invention will be described in detail through preferred embodiments with reference to the accompanying drawings so that the present invention can be easily understood and realized by those skilled in the art. Modifications to the preferred embodiment will be readily apparent to those of ordinary skill in the art, and the disclosure set forth herein may be applied to other embodiments and applications without departing from the spirit and scope of the present invention and the appended claims. In the following description of the present invention, a detailed description of known functions and configurations incorporated herein will be omitted when it may obscure the subject matter of the present invention. The same reference numbers will be used throughout this specification to refer to the same or like parts.

Through the specification, when it is said that some part "includes" a specific element, this means that the part may further include other elements, not excluding them, unless otherwise mentioned. The term "-er(or)", "module", "portion" or "part" is used to signify a unit of performing at least one function or operation. The unit can be realized in hardware, software, or in combination of both.

Figure 1:
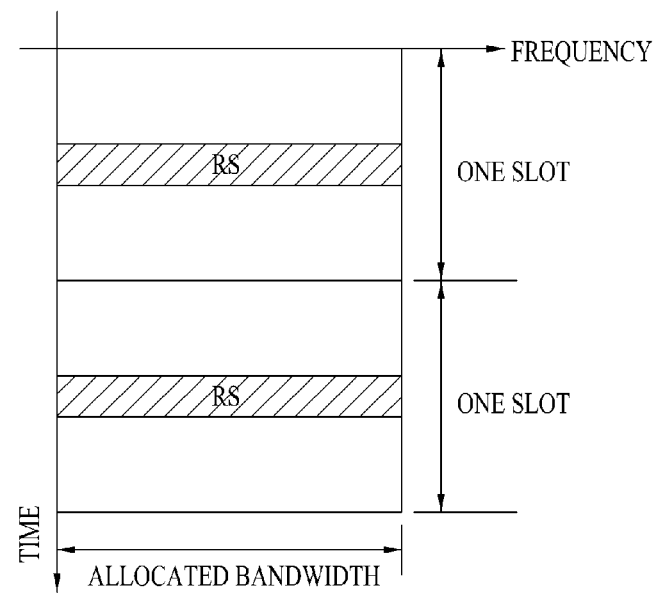
FIG. 1 illustrates an uplink subframe structure in a $3^{rd}$ Generation Partnership Project Long Term Evolution (3GPP LTE) system.
Figure 2:
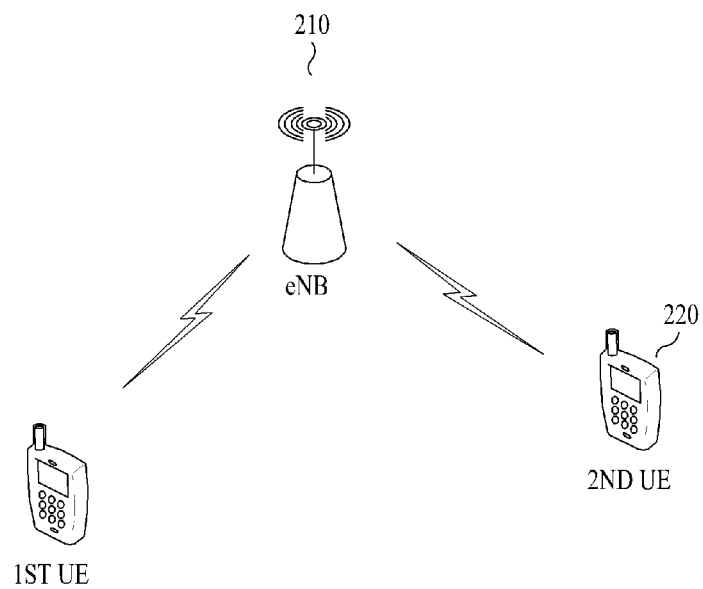
FIG. 2 is a diagram illustrating the configuration of a wireless communication system according to an exemplary embodiment of the present invention.

A description will first be made of a wireless communication system according to an exemplary embodiment of the present invention. FIG. 2 is a diagram illustrating the configuration of a wireless communication system according to an exemplary embodiment of the present invention.

Referring to FIG. 2, the wireless communication system includes an evolved Node B (eNB or eNode B) 210 and a plurality of User Equipments (UEs) 220. The eNB 210 is connected to a network and the UEs 220 communicate with the eNB 210 in Spatial Division Multiple Access (SDMA). For the SDMA communication, the eNB 210 transmits control signals to the UEs 220, and the UEs 220 generate Reference Signal (RS) sequences based on the received control signals and transmit the RS sequences to the eNB 210. Each of the UEs 220 supports multiple antennas and transmits data by spatial multiplexing. Thus each UE 220 transmits a plurality of RS sequences to the eNB 210.

With reference to FIGS. 3 to 8, a method for transmitting uplink RSs according to an exemplary embodiment of the present invention will be described below.

While the following description is made in the context of Long Term Evolution-Advanced (LTE-A), it should be understood that the same principle of the present invention is applicable to any Multiple Input Multiple Output (MIMO) system.

Since the LTE-A system supports multiple antennas on an uplink, a UE may transmit data by spatial multiplexing. For the spatial multiplexing of data, the UE transmits as many RS sequences as a rank supported by the wireless communication system. The rank is defined as the maximum number of different pieces of information that can be transmitted on given channels.

Figure 3:
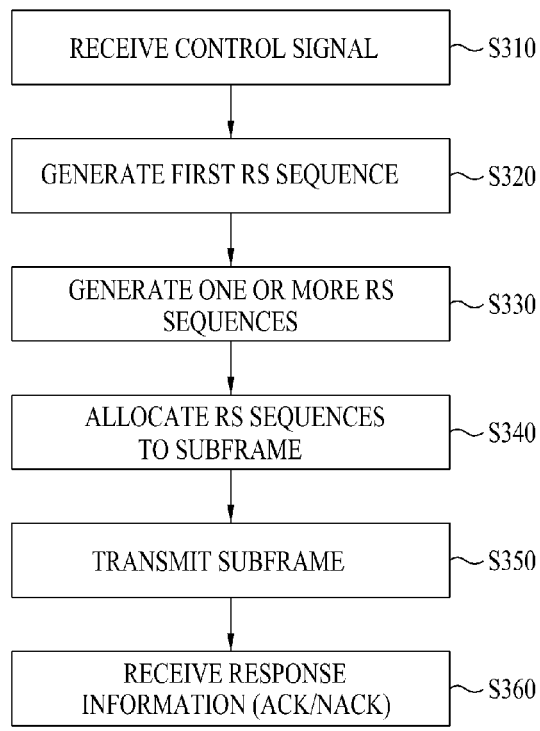
FIG. 3 is a flowchart illustrating a method for transmitting uplink Reference Signals (RSs) according to an exemplary embodiment of the present invention.

FIG. 3 is a flowchart illustrating a method for transmitting uplink RSs according to an exemplary embodiment of the present invention.

Referring to FIG. 3, a UE receives control information from an eNB and determines a first cyclic delay value from the control information in step S310. The control information may include the first cyclic delay value, indication information indicating the first cyclic delay value, or indication information indicating a value by which to calculate the first cyclic delay value. This exemplary embodiment is described on the assumption that the control information includes the indication information indicating the first cyclic delay value.

The control information includes binary bits indicating the first cyclic delay value and the UE determines the first cyclic delay value based on the binary bits. A cyclic delay value is a degree by which a sequence is cyclically shifted in the time domain.

In an LTE system, L×n/12 (n=0, 2, 4, 6, 8, 9 and 10) is available as a cyclic shift value. L denotes the duration of a symbol. Thus binary bits may be mapped to cyclic shift values as listed in Table 1 below.

TABLE 1

[TABLE 1]
[TABLE]

| Binary Bits | Cyclic Delay Value |
|---|---|
| 000 | L * 0/12 |
| 001 | L * 2/12 |
| 010 | L * 3/12 |
| 011 | L * 4/12 |
| 100 | L * 6/12 |

TABLE 1-continued

[TABLE 1]
[TABLE]

| Binary Bits | Cyclic Delay Value |
|---|---|
| 101 | L * 8/12 |
| 110 | L * 9/12 |
| 111 | L * 10/12 |

In step S320, the UE generates a first RS sequence by cyclically shifting a base RS sequence by the first cyclic shift value. The base RS sequence is preset between the eNB and the UE.

Given $S_{original} = \{x_0, x_1, x_2, \ldots, x_{N-1}\}$ as a base RS sequence agreed on between the eNB and the UE, if the first cyclic delay value is Lxk/12, the first RS sequence may be calculated by $$S_{shift-k} = \left\{x_0 \cdot e^{j0}, x_1 \cdot e^{j\frac{k}{12}}, x_2 \cdot e^{j\frac{2k}{12}}, \ldots, x_{N-1} \cdot e^{j\frac{(N-1)k}{12}}\right\} \quad \text{[Equation 1]}$$

For communication between an eNB and a plurality of UEs, RS sequences transmitted by the plurality of UEs should be mutually orthogonal or have small cross correlations with one another. A cyclic delay of a specific sequence in the time domain may result in a sequence orthogonal to the specific sequence, and the specific sequence may be cyclically shifted in the time domain by multiplying the specific sequence by a code having, as elements, complex numbers with constantly increasing phases in the frequency domain.

If the specific sequence is S1 as illustrated in [Equation 2], a sequence S2 is generated by multiplying the sequence S1 by a code $\{1, e^{j1-}, e^{j2-}, \ldots, e^{j(N-1)-}\}$ having, as elements, complex numbers with constantly increasing phases. Thus the sequence $S_2$ is a time-domain cyclic shifted version of the sequence $S_1$, orthogonal to the sequence $S_1$. One UE may use the sequence $S_1$ as its RS sequence, while another UE may use the sequence $S_2$ as its RS sequence.

$$S_1 = \{x_0, x_1, x_2, \ldots, x_{N-1}\}$$

$$S_2 = \{x_0, x_1 e^{j1-}, x_2 e^{j2-}, \ldots, x_{N-1} e^{j(N-1)-}\} \quad \text{[Equation 2]}$$

A description will be made of how a sequence obtained by multiplying a specific sequence by a code having elements being complex numbers with constantly increasing phases is a time-domain cyclic shifted version of the specific sequence.

In [Equation 3], X[k] is an Inverse Fast Fourier Transform (IFFT) signal of a sequence $x[i] = \{x_0, x_1, x_2, \ldots, x_{N-1}\}$, and X'[k'] is an IFFT signal of a sequence obtained by multiplying the sequence x[i] by a code having elements being complex numbers with constantly increasing phases.

$$X[k] = \sum_{i=0}^{N-1} x[i] \cdot e^{j2\pi k \frac{i}{N}}, k = 0, 1, \ldots, N-1 \quad \text{[Equation 3]}$$

$$X'[k'] = \sum_{i=0}^{N-1} x[i] \cdot e^{j2\pi \frac{u}{M} i} \cdot e^{j2\pi k' \frac{i}{N}},$$

$$k' = 0, 1, \ldots, N-1$$

$$X'[k'] = \sum_{i=0}^{N-1} x[i] \cdot e^{j2\pi \left(\frac{k' + uZ}{N}\right)i},$$

$N = MZ, k' = 0, 1, \ldots, N-1$ $X[(k+uZ) \bmod N] = X'[k'], k=0, 1, \ldots, N-1$ It is noted from [Equation 3] that the IFFT signal X'[k'] is a time-domain delayed signal of the IFFT signal X[k]. This means that multiplication of the sequence x[i] by a code having complex numbers with constantly increasing phases as its elements leads to a time-domain cyclic shift of the sequence x[i].

Figure 4:
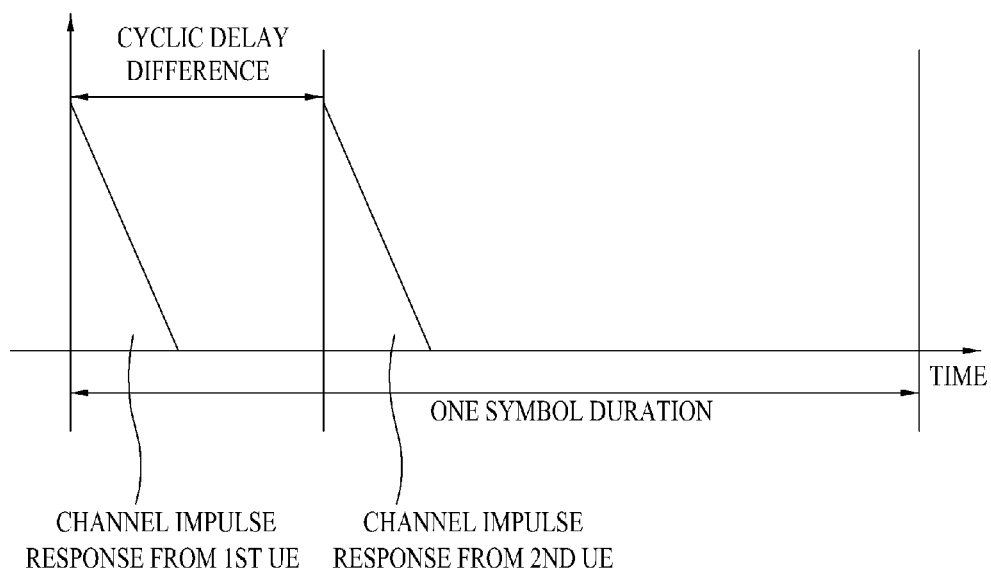
FIG. 4 illustrates channel impulse responses that are estimated using RS sequences received from first and second User Equipments (UEs).

FIG. 4 illustrates channel impulse responses that are estimated using RS sequences received from first and second UEs. As illustrated in FIG. 4, if an RS sequence received from the second UE is a cyclic shifted version of an RS sequence of the first UE, the eNB may estimate the channel impulse responses of the first and second UEs and thus decode signals received from the first and second UEs.

Referring to FIG. 3 again, the UE sequentially generates one or more RS sequences by cyclically shifting the first RS sequence by a multiple or multiples of a second cyclic shift value in step S330.

As stated before, the UE should generate as many RS sequences as a rank supported by the wireless communication system. Let the rank be denoted by R. Then the UE sequentially generates (R-1) RS sequences by cyclically shifting the first RS sequence by multiples of the second cyclic delay value. For example, if R=4, the UE generates a second RS sequence by multiplying the first RS sequence by the second cyclic delay value, a third RS sequence by multiplying the first RS sequence by (2× the second cyclic delay value), and a fourth RS sequence by multiplying the first RS sequence by (3× the second cyclic delay value).

The second cyclic delay value may be signaled to the UE by the eNB or may be preset by the wireless communication system.

In the case where the eNB signals the second cyclic delay value, the second cyclic delay value, indication information indicating the second cyclic delay value, or indication information indicating a value by which to calculate the second cyclic shift value may be included in the control information that the eNB transmits to the UE.

In the case where the second cyclic delay value is preset by the wireless communication system, the eNB does not need signal the second cyclic delay value, thus reducing the amount of the control information transmitted to the UE.

A method for presetting a second cyclic delay value in the wireless communication system will be described below.

The wireless communication system may predetermine the second cyclic delay value, taking into account the length of a Cyclic Prefix (CP).

Figure 5:
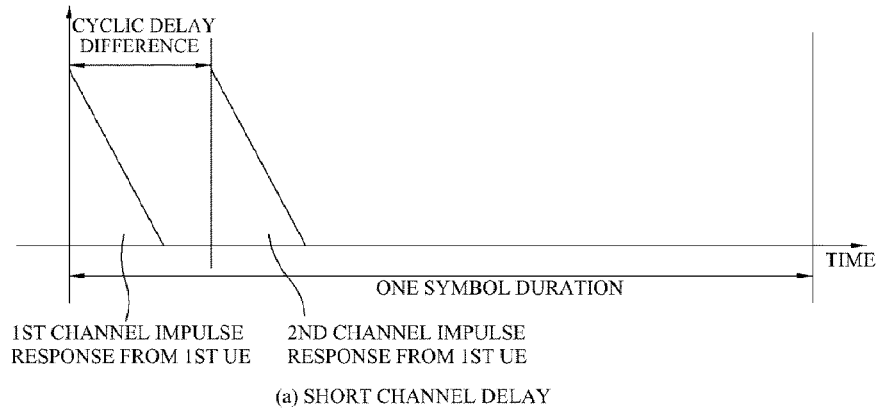
FIG. 5 illustrates channel impulse responses that are estimated using two RS sequences received from one UE, respectively in both cases of a short channel delay and a long channel delay.
Figure 5:
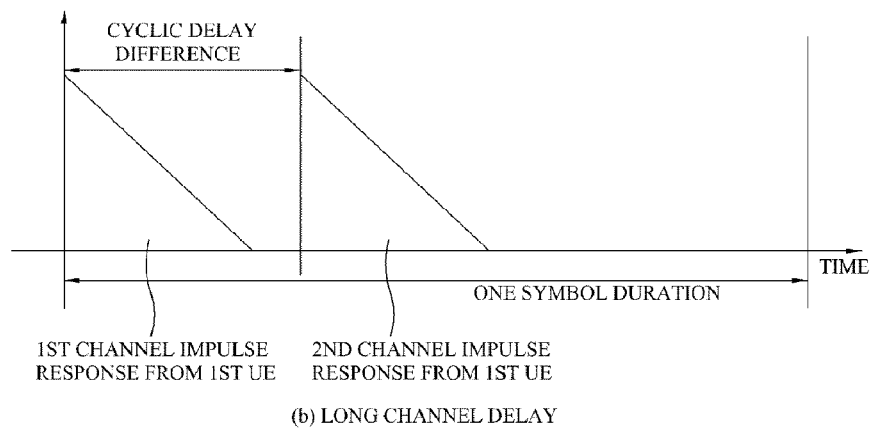

FIG. 5 illustrates channel impulse responses that are estimated using two RS sequences received from one UE, respectively in both cases of a short channel delay and a long channel delay.

Referring to FIG. 5, if the cyclic delay difference between a plurality of RS sequences received from the UE is greater than a channel delay spread in the wireless communication system, the eNB may receive the plurality of RS sequences stably. In other words, when the second cyclic delay value is larger than the channel delay spread, the eNB may receive the plurality of RS sequences stably.

However, the channel delay spread varies in different environments. If the eNB signals a second cyclic delay value to every UE each time the channel delay spread is changed, the amount of control information to be transmitted from the eNB to the UE is remarkably increased.

The length of a CP is determined based on a channel delay spread allowed by the wireless communication system. Hence, the eNB may receive the plurality of RS sequences stably by setting the second cyclic delay value to be larger than the CP length.

For example, a symbol duration L is 66.66-s, a normal CP is about 5-s long, and an extended CP is about 15-s long in the LTE system.

Lx1/12 is about 6-s, longer than the allowed channel delay spread 5-s allowed by a wireless communication system using the normal CP. Thus, the wireless communication system using the normal CP may perform well, when it uses Lx1/12 as the second cyclic delay value.

Lx3/12 is about 18-s, longer than the allowed channel delay spread about 15-s allowed by a wireless communication system using the extended CP. Thus, the wireless communication system using the extended CP may perform well, when it uses Lx3/12 as the second cyclic delay value. If the wireless communication system using the extended CP can tolerate some performance decrease, Lx2/12 is also available as the second cyclic delay value.

A second cyclic delay value set to be the minimum of values larger than a CP length leads to the most efficient use of a given time area.

Figure 6:
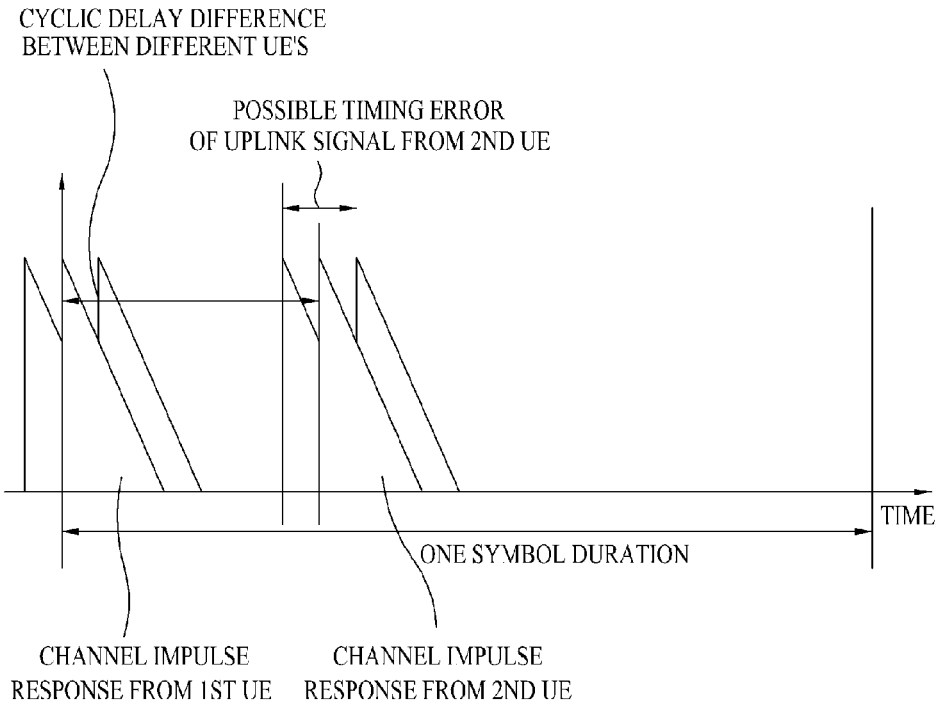
FIG. 6 illustrates timing errors of channel impulse responses that an eNB estimates using RSs received from two UEs.
Figure 7:
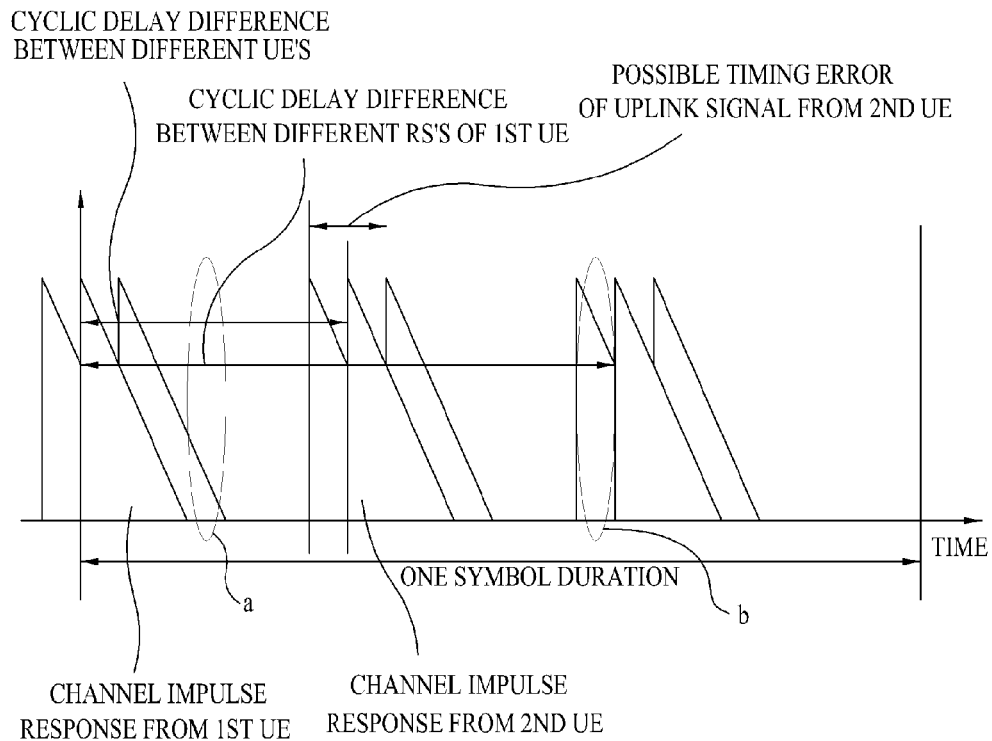
FIG. 7 illustrates a case of a wide cyclic delay difference between a plurality of RSs that a UE transmits.
Figure 8:
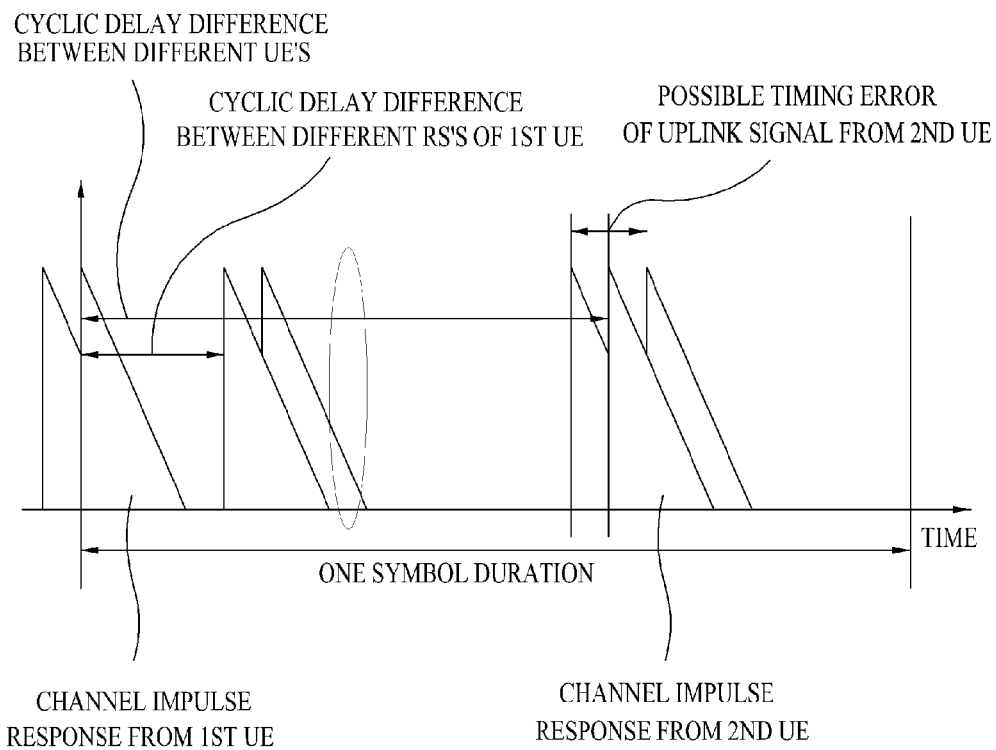
FIG. 8 illustrates a case of a narrow cyclic delay difference between a plurality of RSs that a UE transmits.

FIG. 6 illustrates timing errors of channel impulse responses that an eNB estimates using RSs received from two UEs, FIG. 7 illustrates a case of a wide cyclic delay difference between a plurality of RSs that a UE transmits, and FIG. 8 illustrates a case of a narrow cyclic delay difference between a plurality of RSs that a UE transmits.

Referring to FIG. 6, timing errors may occur to uplink signals transmitted by two UEs according to the locations of the UEs and the degrees of synchronization between the eNB and the UEs. Therefore, the eNB should set a cyclic delay difference between signals transmitted from the two UEs, to avoid interference between channel impulse responses of the two UEs that might otherwise be caused by the timing errors of signals from the UEs.

As illustrated in FIG. 7, however, when the cyclic delay difference between a plurality of RS sequences transmitted by a first UE is so wide that an RS sequence from a second UE is transmitted between the RS sequences of the first UE, the eNB should determine the position of the RS sequence from the second UE, taking into account of the timing errors of channel impulse responses estimated from the RS sequences received from the first UE. That is, the eNB should determine the position of the RS sequence of the second UE based on the timing error of a channel impulse response a estimated from a first RS sequence of the first UE and the timing error of a channel impulse response b estimated from a second RS sequence of the first UE in FIG. 7.

On the other hand, if the cyclic delay difference between the plurality of RS sequences transmitted by the first UE is set to be as narrow as possible as illustrated in FIG. 8, the eNB may determine the position of the RS sequence of the second UE, taking into account only the overall timing error of the channel impulse responses estimated from the RS sequences of the first UE. Consequently, the number of UEs that can be allocated to a given time area may be maximized.

Accordingly, to maximize the use efficiency of a given time area, a second cyclic delay value should be set to the minimum of values larger than a CP length.

In the case where a plurality of available cyclic delay values are predetermined in the wireless communication system, the second cyclic delay value should be determined such that the sum of the first cyclic delay value and the second cyclic delay value is one of the available cyclic delay values. Only if the second cyclic delay value satisfies this condition, the wireless communication system may support it.

Hence, the second cyclic delay value is calculated by subtracting the first cyclic delay value from the minimum of cyclic delay values larger than the sum of the CP length and the first cyclic delay value among the available cyclic delay values.

For example, the LTE system defines the cyclic delay values listed in Table 1 as available ones. Therefore, if the sum of the first and second cyclic delay values, like Lx5/12, is not available as a cyclic shift value in the LTE system, the LTE system does not support the second cyclic value.

When the LTE-A system uses the normal CP, if the first cyclic delay value is Lx4/12 and the system-preset second cyclic delay value is Lx1/12, the sum of the first and second delay values is Lx5/12. In this case, Lx2/12 may be used as the second cyclic delay value because the sum of the first and second cyclic delay values is Lx6/12 supported by the LTE system.

Especially response information (ACKnowledgment/Negative ACKnowledgment (ACK/NACK)) for a transmission block is transmitted in physical resources that have been determined according to the frequency and cyclic delay value of the transmission block. If the second cyclic delay value is determined such that the sum of the first and second cyclic delay values is one of cyclic delay values supported by the LTE system, the eNB may process response information for the data of a plurality of transmission blocks at the same time in the same frequency transmitted by a UE in the same manner as it processes response information for data transmitted at the same time in the same frequency by a plurality of UEs.

Referring to FIG. 3 again, the UE allocates at least one transmission block of the R RS sequences and transmission data to a subframe in step S340 and transmits the subframe in step S350. The R RS sequences may be transmitted through different antennas among a plurality of antennas or mixed and then transmitted through the plurality of antennas.

In step S360, the UE receives response information (ACK/NACK) for each of the transmission blocks from the eNB.

To be more specific, the UE receives response information for a first transmission block in physical resources that have been determined according to the frequency of the transmission blocks and a binary code corresponding to the first cyclic delay value, response information for a second transmission block in physical resources that have been determined according to the frequency of the transmission blocks and a binary code corresponding to the sum of the first and second cyclic delay values, and response information for an $n^{th}$ transmission block in physical resources that have been determined according to the frequency of the transmission blocks and a binary code corresponding to the sum of the first cyclic delay value and the second cyclic delay value x(n−1). It may be further contemplated that the physical resources are determined according to the index of a resource block in which the transmission blocks were transmitted, instead of the frequency of the transmission blocks.

For example, two uplink transmission blocks were transmitted in a resource block with index $I_{RB}$. If a binary code corresponding to the first cyclic delay value is '000', the UE receives response information for the first transmission block in physical resources $I_{ACK/NACK1}$=f($I_{RB}$, 000). In case of the normal CP, the second cyclic delay value is Lx1/12, the sum of the first and second cyclic delays is Lx1/12, and a binary code corresponding to the sum is 001. Hence, the UE receives response information for the first transmission block in physical resources $I_{ACK/NACK2}=f(I_{RB}, 001)$.

Mode for the Invention

Various embodiments have been described in the best mode for carrying out the invention.

Industrial Applicability

The present invention is applicable to a method for conducting communication in a wireless communication system. More particularly, the present invention is applicable to a method for transmitting and receiving uplink RSs in a wireless communication system.

The exemplary embodiments of the present invention are not implemented only by the apparatus and/or method as set forth herein. Rather, it is obvious to those skilled in the art that the exemplary embodiments of the present invention can be realized by means of a program for executing functions corresponding to elements and features of the exemplary embodiments of the present, and/or a recording medium with the program recorded thereon.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method for transmitting uplink reference signals through multiple antennas by a user equipment in a wireless communication system, the method comprising:
   receiving control information related to a first cyclic delay value and a second cyclic delay value from a base station;
   transmitting a first reference signal sequence to the base station, wherein the first reference signal sequence is generated by cyclically shifting a base reference signal sequence by the first cyclic delay value; and
   transmitting a second reference signal sequence to the base station, the second reference signal sequence being obtained by cyclically shifting the first reference signal sequence by a multiple of the second cyclic delay value,
   wherein the second cyclic delay value is set to a minimum of values larger than a cyclic prefix length,
   wherein the first cyclic delay value is determined according to the cyclic prefix length used in the wireless communication system, and
   wherein the first cyclic delay value is calculated by multiplying a symbol duration by a minimum of p/12 values larger than a value resulting from dividing the cyclic prefix length by the symbol duration, p being integers equal to or larger than 0 and less than 12.

2. The method according to claim 1, further comprising, if the wireless communication system has a rank of 3 or higher, transmitting (the rank-2) reference signal sequences generated sequentially by cyclically shifting the second reference signal sequence by multiples of the first cyclic delay value.

3. A method for receiving uplink reference signals transmitted through multiple antennas in a wireless communication system, the method comprising:
   transmitting control information related to a first cyclic delay value and a second cyclic delay value to a user equipment; and
   receiving a plurality of reference signal sequences including a first reference signal sequence generated based on the first cyclic delay value and a second reference signal sequence generated by cyclically shifting the first reference signal sequence by a multiple of the second cyclic delay value,
   wherein the second cyclic delay value is set to a minimum of values larger than a cyclic prefix length,
   wherein the first cyclic delay value is determined according to the cyclic prefix length used in the wireless communication system, and
   wherein the first cyclic delay value is calculated by multiplying a symbol duration by a minimum of p/12 values larger than a value resulting from dividing the cyclic prefix length by the symbol duration, p being integers equal to or larger than 0 and less than 12.

4. The method according to claim 3, further comprising:
   receiving a plurality of transmission blocks from the user equipment;
   transmitting response information for a first transmission block among the plurality of transmission blocks in physical resources determined according to a transmission frequency of the plurality of transmission blocks and the first cyclic delay value; and
   transmitting response information for a second transmission block among the plurality of transmission blocks in physical resources determined according to the transmission frequency of the plurality of transmission blocks and a sum of the first and second cyclic delay values.

5. The method according to claim 3, wherein if the wireless communication system has a rank of 3 or higher, the plurality of reference signal sequences further include (the rank-2) reference signal sequences generated sequentially by cyclically shifting the second reference signal sequence by multiples of the second cyclic delay value.

* * * * *